June 21, 1927.
M. R. BRUNER
TRACTOR PLOW
Filed May 28, 1926
1,633,205
2 Sheets-Sheet 1
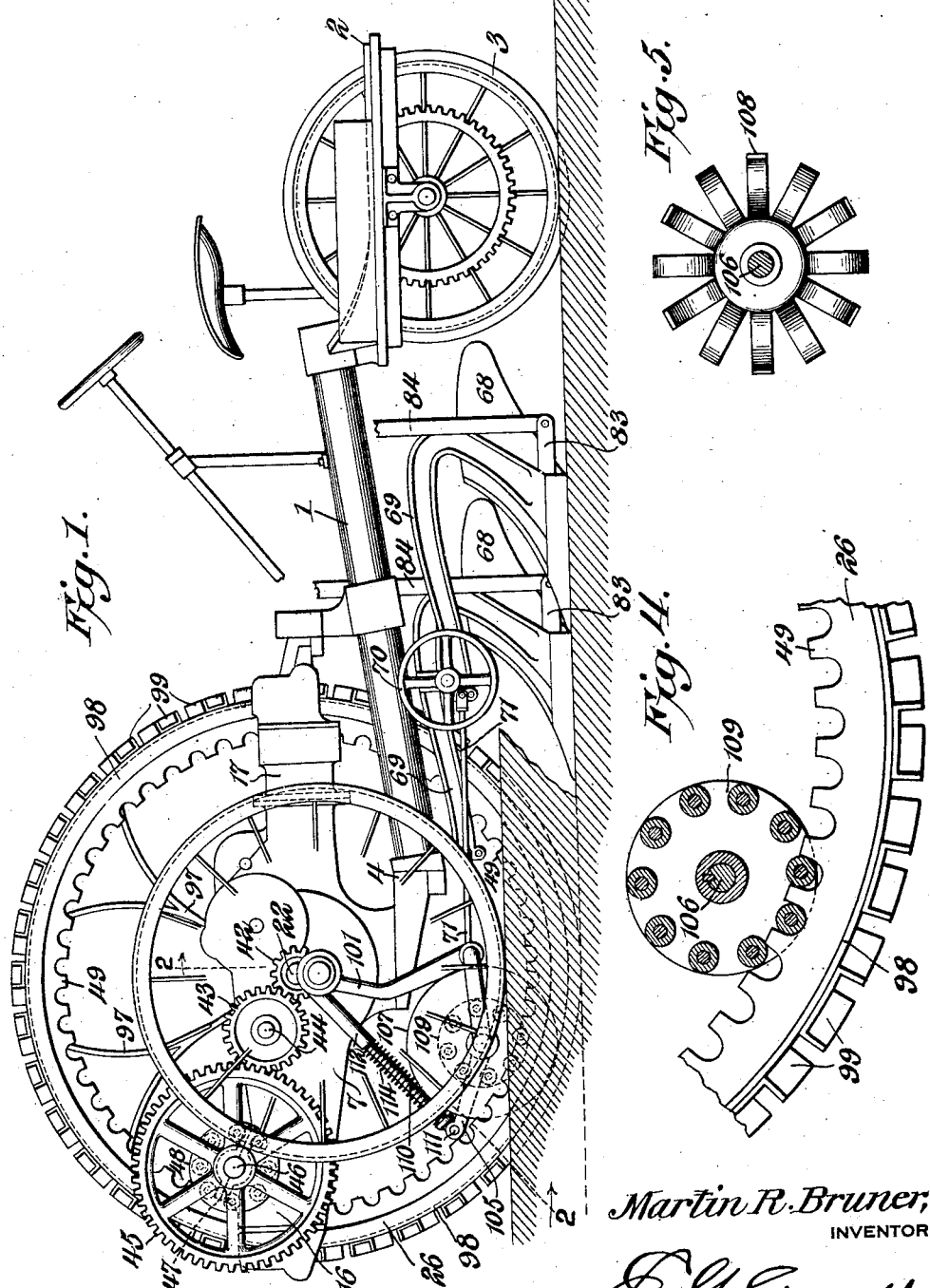
Martin R. Bruner,
INVENTOR,

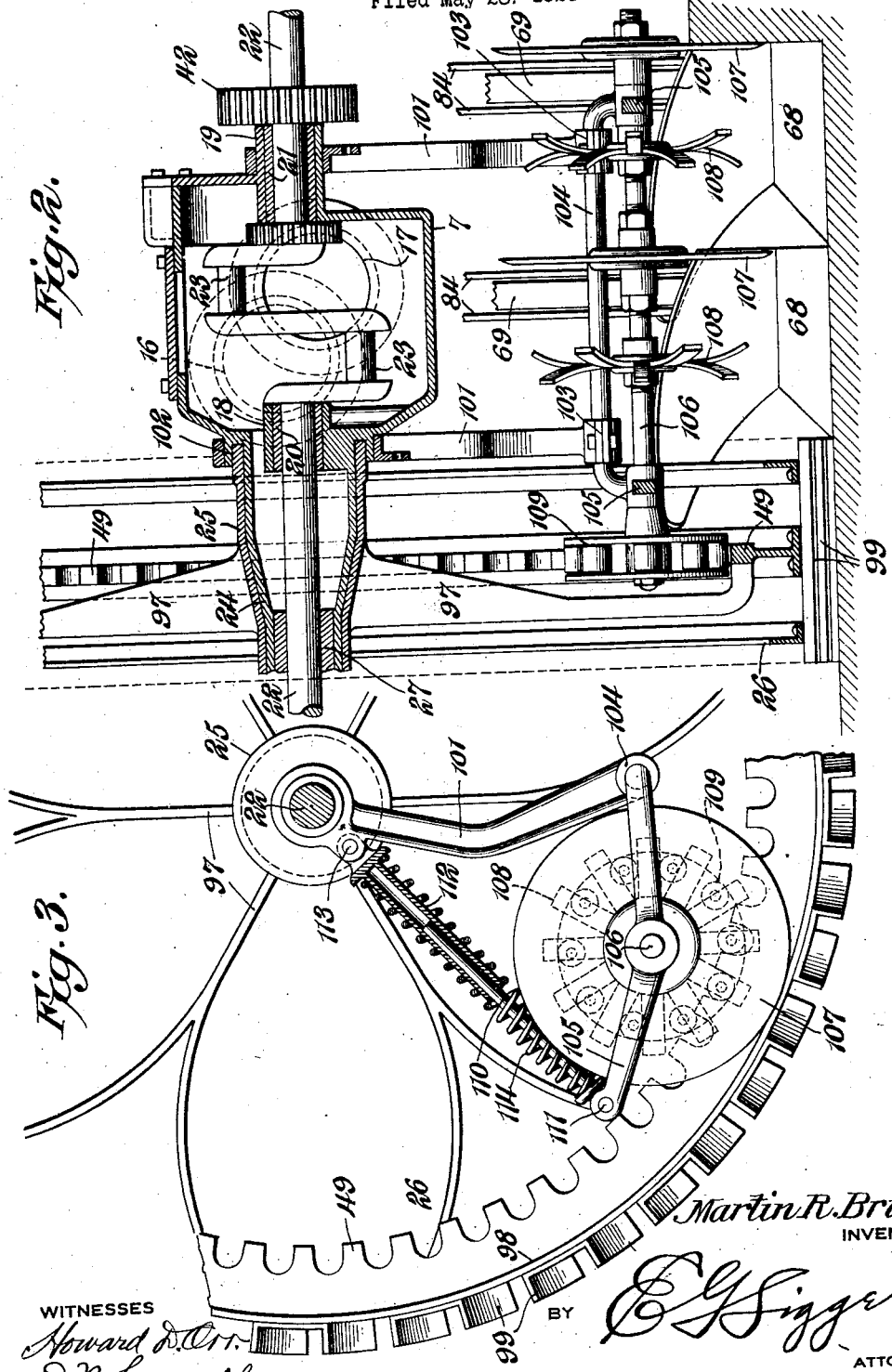

Patented June 21, 1927.

1,633,205

UNITED STATES PATENT OFFICE.

MARTIN R. BRUNER, OF BUCKLAND, OHIO.

TRACTOR PLOW.

Original application filed January 8, 1925, Serial No. 1,244. Divided and this application filed May 28, 1926. Serial No. 112,330.

This invention relates to a tractor plow, which is driven preferably by an internal combustion engine, and provided with a plurality of plows arranged in the form of a gang, so that it is adapted to be used in conducting farm operations on a comparatively large scale.

The present application is a division of my earlier application, Serial No. 1,244, filed January 8, 1925.

The object of the invention herein claimed is to provide improved trash feeding means for disposing of the trash in front of the plows, so that it will be turned under, and specifically to provide positively driven means which feeds the trash rearwardly at a somewhat greater speed than the forward movement of the plows.

The specific construction and operation of the various elements constituting the subject matter of the present application will be more specifically described in connection with the accompanying drawings, which illustrate the same in their preferred form.

In the drawings:

Figure 1 is a side elevation of the invention, with parts broken away in order to show more clearly the operative mechanism.

Figure 2 is a vertical section taken substantially on the line 2—2 of Figure 1, and showing particularly the operation of the colter disks and trash feeders.

Figure 3 is a detail view, partly in section, showing the roller gear drive for the shaft which carries the colter disks and trash feeders.

Figure 4 is a detail view, partly in section, showing the roller gear drive for the tractor wheel.

Figure 5 is a detail view of one of the trash feeders with its shaft shown in section.

The tractor plow, to which the present invention relates, includes a main frame, having a central longitudinal member 1, which may be called the backbone of the machine, and is preferably tubular and of comparatively large diameter, so as to secure the maximum rigidity to resist lateral and torsional strains. Welded or otherwise secured to the rear end of said backbone is a horizontally disposed ring 2, which is supported by a rear wheel 3. Secured to the front end of the backbone 1, in a similar manner, is a strong and rugged transverse beam 4, forming a substantial support for the engine block 7.

The engine herein shown has two cylinders 16 and 17 secured to its front and rear ends respectively, and bearings 18 and 19 are provided within the engine block 7, as shown in Figure 2, and lined with bushings 20 and 21 respectively, for supporting a crank shaft 22. The latter is provided with two cranks 23, suitably located for cooperation with the cylinders 16 and 17. The engine block 7 is extended at one side in the form of an axle 24, on which is journaled the hub 25 of the main tractor or bull wheel 26, which is adapted to ride in the dead furrow. A bushing 27 is also provided within the end of the axle 24 to provide additional bearing for the crank shaft 22.

The driving mechanism between the engine and the bull wheel includes a pinion 42, mounted on the crank shaft 22 outside of the engine block 7. The pinion 42 meshes with an idler gear 43 mounted on a stud 44, which is secured to the engine block. The idler 43 in turn drives a gear wheel 45, which is secured to one end of a countershaft 46, journaled in suitable bearings 47 which are also secured to the engine block. The opposite end of the shaft 46 has a roller gear 48 secured thereto, which meshes with an internal gear 49 formed on the inside of the rim of the bull wheel 26.

The frame of the machine is adapted to support a plurality of plows 68, two being shown in the present instance. Each plow is secured in the usual manner to a beam 69, which is provided at its forward end with a gage wheel 70, and is pulled forwardly by means of a bar 71, pivotally connected to its front end. The plows are, of course, arranged, so that one will follow the other. For supporting the plows at the required depth, the shoe of each plow has secured thereto a rearwardly projecting arm 83, which is pivotally connected to the lower end of a supporting standard 84 mounted on the frame of the tractor.

As heretofore stated, the hub 25 of the bull wheel is journaled on the axle 24. The spokes 97, extending from this hub, are curved or dished, as shown in Figure 2, so as to clear the roller gear 48. The rim 98 is secured to the outer ends of the spokes, and has secured to its outer face a series of tractions lugs 99.

Hanger bars 101 (Figures 2 and 3) are supported in front of the plows at opposite sides of the engine block 7, one of these bars being pivotally supported on the outer surface of the bearing 19, and the other being pivotally supported on an annular flange 102, which surrounds the axle 24 and overhangs the inner end of the hub 25. The lower ends of these hanger bars are provided with bearings 103, in which is journaled a yoke 104 having forwardly projecting arms 105. A shaft 106, journaled in these arms, carries colter disks 107 and trash feeder wheels 108. The shaft 106 at one end is provided with a roller gear 109, normally in mesh with the internal gear 49, and so proportioned that the colter disks and trash feeders will be rotated slightly faster than the forward movement of the machine. The arms 105 have rods 110 pivoted, as at 111, to their outer ends, which rods are telescopically connected to sleeves 112, pivotally mounted at 113 on the hubs of the hanger arms 101. Expansile coiled springs 114 surround the rods 110 and sleeves 112, and hold the gear 109 normally in mesh with the internal gear 49, so as to positively rotate the shaft 106, and cause loose stalks and other trash to be fed to the colter disks 107 and to be severed thereby. The springs 114, however, are adapted to yield, so as to permit the roller gear 109 to be thrown out of mesh in case the trash feeders meet with any unusual obstruction.

In the normal operation of the plow, the bull wheel 26 is driven from the engine through the medium of the gears 42, 43 and 45, and the roller gear 48. The bull wheel, in turn, through the medium of the roller gear 109, which is normally in mesh with the internal gear 49, drives the shaft 106 at such speed that the lower portions of the colter disks 107 and trash feeders 108 move rearwardly slightly faster than the plows move forwardly. Whatever trash is lying on the ground, therefore, is positively fed rearwardly into the path of the plows, and is cut or broken up, so that it will be turned under without clogging. The springs 114 are strong enough to hold the gear 109 always in mesh with the internal gear 49, except when such unusual obstruction is encountered by the trash feeders that a continued rotation thereof would be liable to cause breakage. In this event, the springs 114 will yield sufficiently to permit the roller gear 109 to slip.

While I have shown and described specifically the details of the trash feeding mechanism in what is regarded at present as its preferred form, it is to be understood that various modifications may be made therein without any material departure from the salient features of the invention as expressed in the claims.

What is claimed is:

1. In a tractor implement, the combination of a wheel supported main frame, plows carried thereby, a transverse shaft journaled in front of the plows and having colter disks thereon, trash feeders on said shaft, and means for positively rotating said shaft to feed the trash rearwardly as the tractor advances over the field.

2. In a tractor implement, the combination of a main frame, wheels supporting said frame, one of said wheels being provided with an internal gear, an engine mounted on the frame and operatively connected with one of said wheels, plows carried by the frame, a transverse shaft journaled in front of the plows and having colter disks thereon, trash feeders also secured to said shaft, and a gear on said shaft normally in mesh with said internal gear and driven thereby to feed the trash rearwardly as the tractor advances over the field.

3. In a tractor implement, the combination of a main frame, a plow carried thereby, a transverse shaft journaled in front of the plow and having a colter disk thereon, trash feeders secured to said shaft and engaging the ground, and means for rotating said shaft in such a manner that the ground engaging portions of the trash feeders have a rearward movement with respect to the ground as the plow moves forwardly.

4. In a tractor implement, the combination of a main frame, a plurality of wheels supporting said frame, including a traction wheel provided with an internal gear, plows carried by the frame, hanger bars suspended to swing about the axle of the traction wheel as an axis, a yoke pivotally mounted in the free ends of the hanger bars and having spaced arms, a shaft journaled in said arms having a gear wheel normally in mesh with said internal gear, colter disks and trash feeders secured to said shaft, and yieldable means connected to the outer ends of the yoke arms permitting them to swing and disengage said gear wheel from the internal gear whenever unusual resistance is encountered.

5. In a tractor implement, the combination of a wheel supported frame, an engine mounted on the frame and operable to drive one of the supporting wheels to move the tractor over the field, said engine having a crank shaft in alinement with the axis of the driven wheel, hanger bars mounted to swing about said crank shaft as an axis, a shaft mounted in said hanger bars, colter disks and trash feeders secured to said last-mentioned shaft, and means to drive the same from the driven ground wheel to feed the trash rearwardly.

In testimony, that I claim the foregoing as my own, I have hereto affixed my signature.

MARTIN R. BRUNER.